(12) United States Patent
Arisa Busquets

(10) Patent No.: US 9,133,872 B2
(45) Date of Patent: Sep. 15, 2015

(54) TOLERANCE COMPENSATOR

(71) Applicant: ILLINOIS TOOL WORKS INC., Glenview, IL (US)

(72) Inventor: Jaume Arisa Busquets, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/359,584

(22) PCT Filed: Oct. 4, 2012

(86) PCT No.: PCT/ES2012/000257
§ 371 (c)(1),
(2) Date: May 21, 2014

(87) PCT Pub. No.: WO2013/076324
PCT Pub. Date: May 30, 2013

(65) Prior Publication Data
US 2014/0328645 A1    Nov. 6, 2014

(30) Foreign Application Priority Data

Nov. 24, 2011   (ES) .................................. 201101246

(51) Int. Cl.
*F16B 43/02*    (2006.01)
*F16B 35/04*    (2006.01)
*F16B 5/02*     (2006.01)

(52) U.S. Cl.
CPC ............... *F16B 35/04* (2013.01); *F16B 5/0233* (2013.01)

(58) Field of Classification Search
CPC ................................ F16B 35/00; F16B 43/02

USPC .......... 411/107, 176, 178, 187–188, 546, 547
See application file for complete search history.

(56) References Cited

U.S. PATENT DOCUMENTS

| 830,501 | A * | 9/1906 | Goehst ....................... 174/153 G |
|---|---|---|---|
| 6,357,953 | B1 * | 3/2002 | Ballantyne ...................... 403/43 |
| 6,431,602 | B1 | 8/2002 | Ralko et al. |
| 6,789,993 | B2 * | 9/2004 | Ozawa et al. ................. 411/546 |
| 2002/0176738 | A1 | 11/2002 | Kluting |
| 2003/0077118 | A1 | 4/2003 | Kobusch et al. |
| 2007/0065250 | A1 | 3/2007 | Nagayama |
| 2007/0092355 | A1 * | 4/2007 | Burger et al. ................. 411/535 |
| 2008/0038090 | A1 * | 2/2008 | Figge et al. ................... 411/433 |
| 2008/0304907 | A1 | 12/2008 | Figge et al. |

FOREIGN PATENT DOCUMENTS

EP    1767287  A1    3/2007

OTHER PUBLICATIONS

ISR for PCT/ES2012/000257 mailed Feb. 1, 2013.

* cited by examiner

*Primary Examiner* — Roberta Delisle
(74) *Attorney, Agent, or Firm* — Lowe Hauptman & Ham LLP

(57) ABSTRACT

TOLERANCE COMPENSATOR, of the type used to attain the fastening of two elements together that may be located at a slightly variable distance, which is utilized, for instance, in automobile vehicles and is formed, at least, by an inner nut and an outer nut, in which said inner nut can a sheet coiled on itself, it being fitted with at least two threaded perimeter sectors for said outer nut; at least one side thereof also being the support for respective retaining elements towards the inside of said inner nut that provide friction spots against said threading of said screw.

20 Claims, 5 Drawing Sheets

TOLERANCE COMPENSATOR

RELATED APPLICATIONS

The present application is a National Phase of International Application Number PCT/ES2012/000257 filed Oct. 4, 2012, which claims priority to Spanish Application Number P201101246 filed Nov. 24, 2011.

FIELD OF THE INVENTION

The present invention refers to a tolerance compensator of the type used to attain the fastening of two elements that may be located at a slightly variable distance together, which is utilized, for instance, in automobile vehicles for fastening the dashboard supports to the vehicle frame, in which a very lightweight piece has been performed, this piece being composed of several parts, it being economical in terms of manufacture and displaying a good performance against vibrations.

PRIOR ART

Prior art for this type of application used to utilize a cylindrical tube as a spacer, it being attached for instance through soldering within pillar "A" of the vehicle, leaving some slack inside the pillar. Long axle screws passing through the cylinder are utilized in order to fasten the dashboard support and the body pillar. The screw is then tightened until the specified torque to secure fastening is obtained.

Among the problems posed by this type of connection is the relatively elevated weight and cost of the assembly as well as the fact that it contributes to the deformation of the pillar in those areas where it is coupled with the body as a result of the specified tightening required for the fastening.

Account must be taken, and this is the main technical difficulty that the device of the invention is to overcome, of the fact that due to the manufacturing margins of the parts to be coupled their separation distance is not always exactly the same, so that the operator, when joining them, should be capable of adapting to that variation without deforming the dashboard or another application during fastening thereof. The tolerance compensator of the present invention permits to perform said connection in a firm manner while keeping a variable distance margin between said elements.

Another of the main goals of the present invention is to obtain a reduction in the material used for manufacturing the piece in order to make it more light-weight and reduce manufacturing costs.

These and other advantages of the present invention will become more apparent throughout the description of same that follows.

BRIEF EXPLANATION OF THE INVENTION

The present invention describes a tolerance compensator comprising a collar or washer screw, two independent nuts having different diameters, one of them being exterior to the other, in which the bigger nut can be threaded onto the exterior threading of the smaller nut, said smaller nut being provided with friction-retaining inner devices that act against the threading of the screw.

The smaller nut, viewed in section, is provided with different alternated sectors. Some are provided with outer threading while some others act as supports for friction elements or inner retainers.

Material used in the assembly can be reduced because the same thickness of the piece supports both the outer threading and the inner retaining elements.

In one of the embodiments of the invention said inner nut has, viewed in section, an approximately hexagonal appearance in which some of its sides are bent inwardly in an alternated manner, this resulting in two groups of sides, some of them being exterior and featuring an outer threading and some of them being interior so as to support friction or retaining elements.

In another of the main and possible embodiments of the invention, the inner nut is cylindrical and features in its outer threading zones devoid of threading that, conversely, are fitted with friction elements directed towards the center of the nut and against the screw of the application.

Such smaller nut, which can feature various embodiments at a variable height can be performed either from a wound-up sheet with its tips joined together or through drawing processes. In the first case, said connection of both sides can be secured through coupling, riveting, soldering or any other method. Conversely, in other embodiments, such as the deep-drawn piece, it may be devoid fixed connections whatsoever.

The retaining elements can be inwardly bent legs offering friction spots with the screw. Each nut sector is usually fitted with more than one retainer.

At the ends of this smaller threading upper and/or lower legs can be fitted. Additionally or alternatively, when said ends are zones devoid of threading said ends can be provided of the aforesaid inner friction mechanisms, for instance in the form of friction legs.

The outer thread of smaller said nut can be metrical or of any other special class, clockwise or counterclockwise depending on the operation of said piece in each embodiment and the traction requirements.

As a result of this construction it has been obtained a lightweight tolerance compensator with a significant reduction in material, which is easy to use and economical in terms of manufacturing costs owing to the simplicity of the elements forming it.

BRIEF EXPLANATION OF THE DRAWINGS

For a better understanding of the invention it is accompanied by a sheet of merely illustrative and non-limiting drawings.

In FIG. 8 it is shown the tolerance compensator assembly, but showing the screw of the application, whereas FIG. 9 is a perspective view that merely displays the inner nut.

DETAILED EXPLANATION OF THE INVENTION

Figure 1:
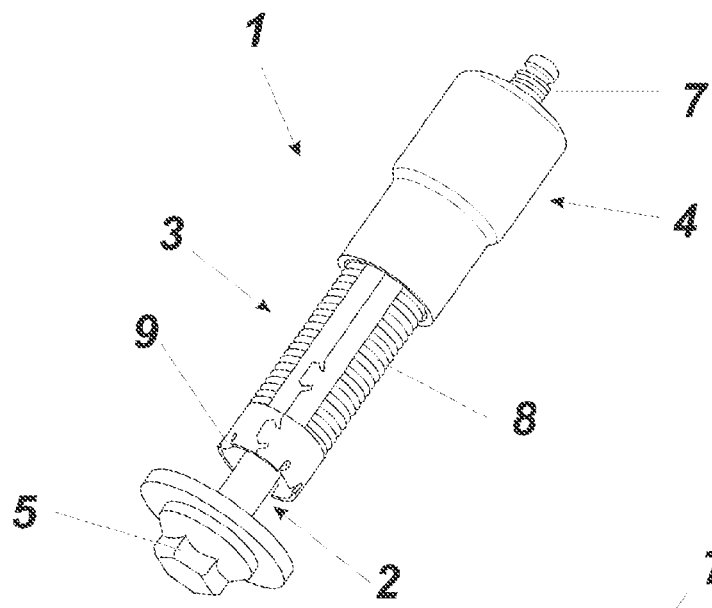
FIG. 1 shows a perspective view of a preferred embodiment of the present invention with its parts joined together and the entire assembly ready for use.
Figure 2:
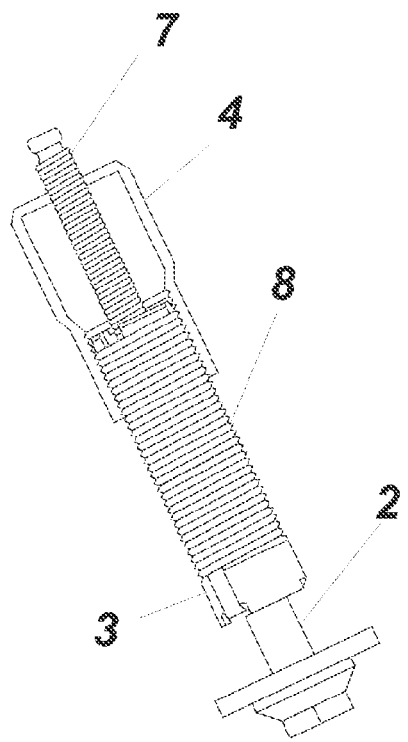
FIG. 2 shows a perspective view of the same embodiment like that of the preceding figure but showing in this case part of the inner structure thereof.
Figure 3:
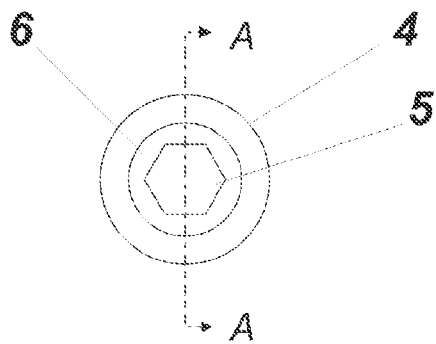
FIGS. 3 to 5 show various perspective views of the inner nut of the tolerance compensator of the present invention, in accordance with the embodiment illustrated in the previous figures, FIGS. 4 and 5 being respective sections of FIG. 3.
Figure 4:
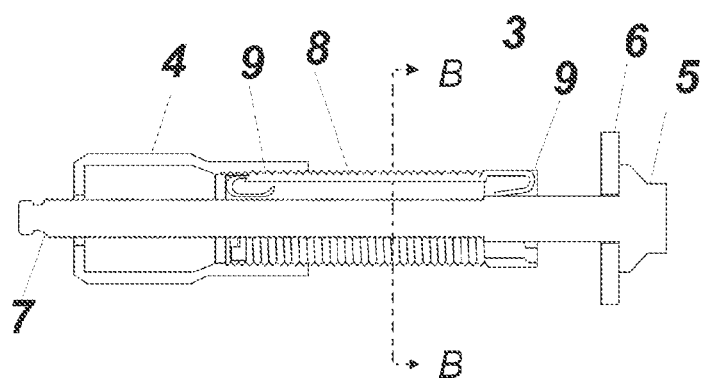
Figure 5:
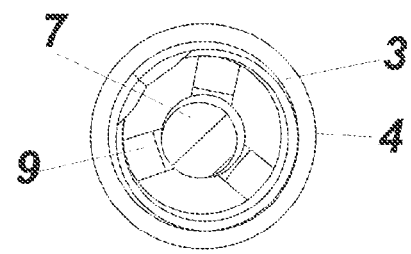

The present invention comprises a tolerance compensator of the type used to attain the fastening of two elements that may be located at a slightly variable distance together, which is utilized, for instance, in automobile vehicles for fastening the dashboard supports to the vehicle frame, it being formed by at least a combination of a screw (2) and an inner nut (3), the inner nut (3) being configured to receive a screw (2).

The screw (2) is fitted with a standard or a special head (5) with a collar or a washer (6) and an utterly or partially threaded axle (7).

The inner nut (3) is an approximately elongated body provided with at least one or more non-adjacent sectors that are fitted with an outer threading (8) for threading of said outer nut (4).

This perimeter threading (8) of the inner nut (3) can be metrical or of any other special type in accordance with the traction requirements of each embodiment and can be clockwise or counterclockwise.

Furthermore, such sides devoid of outer threading are the support for respective retaining elements, whether in the form of drawn elements or in the form of legs (9) bent toward the inside of said inner nut (3), said elements being capable of providing friction spots against the cylindrical portion or the threading (7) of said screw (2).

The distribution of said threaded and non-threaded zones in said inner nut (3) changes in every embodiment. In general terms its position can be described, whenever there is one or more of these sectors, by indicating that these are non-adjacent sectors from a medium sagittal or transverse plane to the same plane of said inner nut (3). That is, for instance the non-threaded sectors that are provided with inner friction retaining elements can be placed spaced apart both vertically, for instance at the ends of the cylinder, and horizontally spaced apart at the circular perimeter of the inner nut, or also spaced apart in either of these manners.

Figure 11:
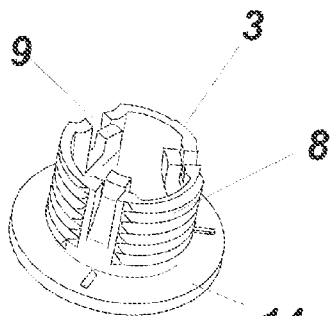
FIG. 11 shows a cross section of another possible embodiment within the scope of the invention. In this case the inner nut has been made through stamping and is of a lower height than in the preceding embodiments while keeping the distinctive features of the present invention.
Figure 12:
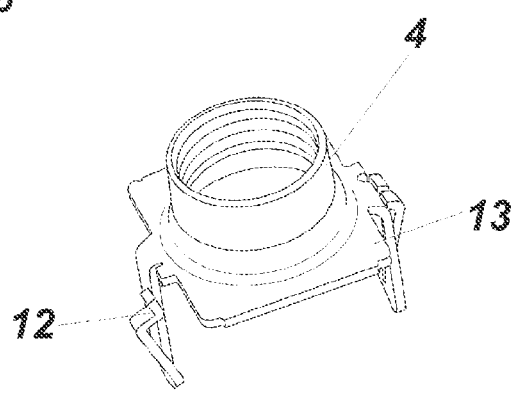
FIG. 12 shows a perspective view of the outer nut that is complemented with the embodiment of the preceding figure and includes legs that anchor it to the spot where it is applied.
Figure 13:
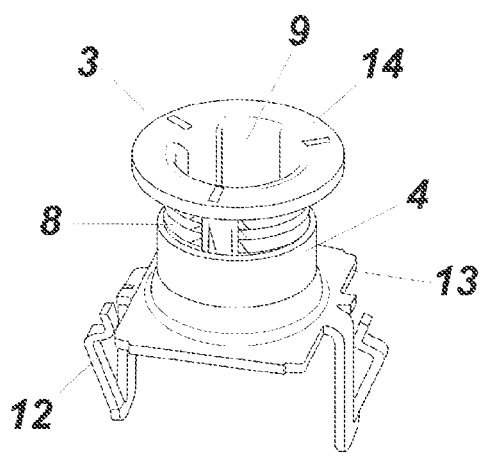
FIGS. 13 and 14 provide two different perspectives of a tolerance compensator assembly in its assembled condition in accordance with the embodiment illustrated in FIGS. 11 and 12 but with no application screw.
Figure 14:
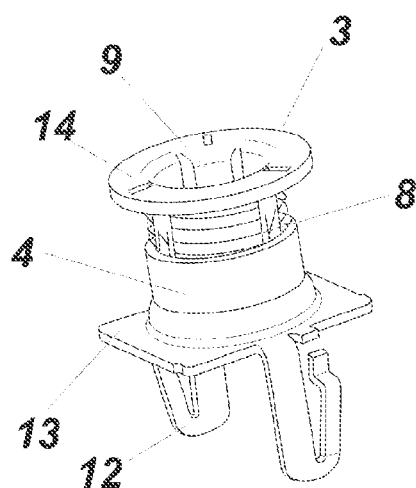

This inner nut (3) can be made through different means, through drawing or, as shown in FIGS. 11, 13 and 14. The inner nut (3) is an approximately hexagonal-shaped single piece that can be fitted with an annular perimeter surface (14) at the upper end thereof for facilitating handling of the piece.

Figure 6:
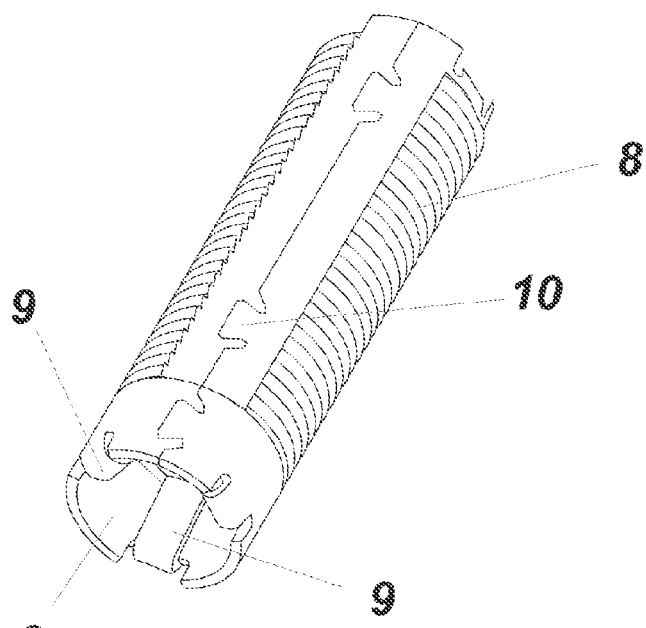
FIGS. 6 and 7 show perspective views, in the embodiment of the previous figures, of the inner nut.
Figure 7:
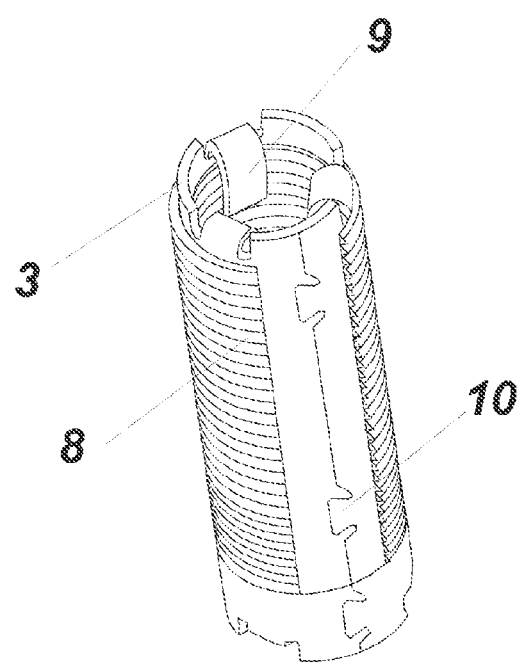
Figure 8:
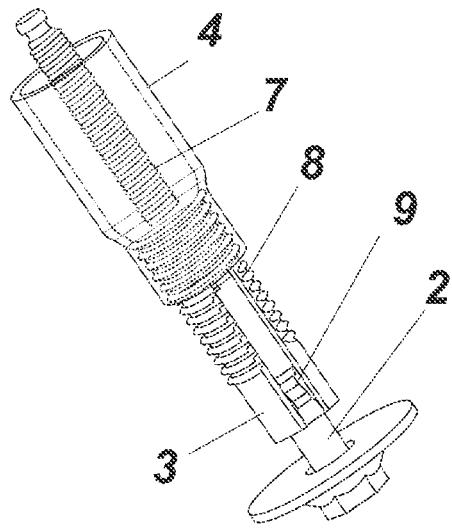
FIGS. 8 and 9 show perspective views of another embodiment within the scope of the present invention in which the outer nut features an approximately hexagonal form.
Figure 9:
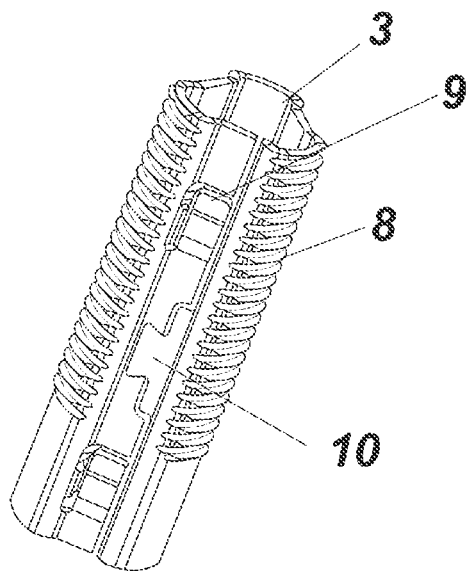
Figure 10:
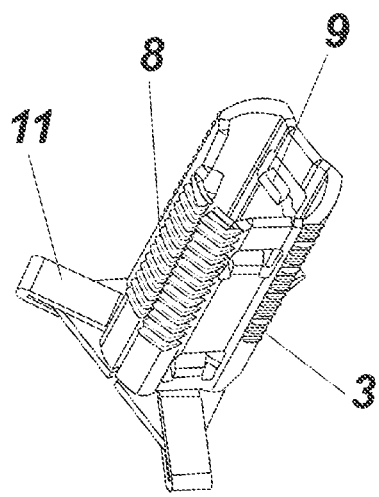
FIG. 10 shows another possible embodiment of the inner nut that is similar to the embodiment of the preceding figure and includes fastening and/or centering legs.

Another example of preferred embodiment of the invention is shown in FIGS. 6 and 7, by means of an approximately flat band that coils on itself. Connection of the ends of said sheet forming the inner nut (3) can be secured at both faces through different means: connection bridges (10), riveting, soldering or any other method, or even through no fixed connection whatsoever, it being the outer nut itself (4) responsible for staying closed and attached to the inner nut (3).

As shown in the figures accompanying the present description, said inner nut (3) can be, viewed cross-sectionally, approximately hexagonal with three alternate sectors provided with outer threading (8) and three further sectors acting as support for said bent or retaining legs (9). These sectors devoid of outer threading can be fitted with one or more retaining elements or legs (9).

In other possible embodiments of the invention the inner nut (3), provided with an outer threading (8), could be a drawing piece that is therefore devoid of sides to join together.

Several legs (11) can be provided at the ends of such inner nut (3) so as to minimize use of washers and to help alignment of the screw at the same time.

The inner nut (3), smaller in diameter than the outer nut (4), can be of a variable height in its various possible embodiments.

The constructional nature of said inner nut (3) involves significant material saving as it is not required a greater thickness of the surface thereof to form and support the outer threading (8) and the inner retaining elements since some portions of said inner nut (3) form said outer threading (8) and other different portions form the inner retaining elements.

Thanks to the significant material saving obtained with solution disclosed by the present invention the weight of the inner nut (3) can be approximately of 11.1 g compared to the 35.6 g of the most lightweight known solutions.

In the stamped preferred embodiment of the invention shown in FIGS. 11 to 14 the outer nut (4) features means for anchoring to the installation surface thereof. The outer nut acts as clip attached to the vehicle surface and is provided with an approximately flat surface (13) from which anchoring legs (12) emerge towards the installation panel or surface.

The operation of the tolerance compensator device (1) is plainly simple. An operator introduces the device all the way to the bottom in the cavity created between the dashboard support and the corresponding sheet of the bodywork when the lower portion thereof comes in contact with the metal sheet. When turning the screw (2) two opposed movements occur in said tolerance compensator (1). On the one hand, friction of the threading (7) of said screw (2) against said bent legs (9) of the retaining elements causes the ascent of the inner nut (3) until it reaches the outer metal surface. On the other hand, the opposite movement of the outer nut (4) occurs, this resulting in the fitting of the solution of the invention between the fastening sheets of the dashboard support and pillar "A" of the vehicle bodywork and the subsequent adaptation thereof to its installation positions. This is thus an automatic assembly in which tightening is performed at the same time as the installation and adjustment of the tolerance compensator (1).

In this manner it has been attained a very lightweight solution involving significant reduction in material, in which some parts can even be made of plastic material, like for instance the bent legs (9) of the retaining elements.

It is understood that finish or shape details in the present case are liable to variation provided that the essence of the invention is not altered.

The invention claimed is:

1. TOLERANCE COMPENSATOR, of the type used to attain the fastening of two elements together that may he located at a slightly variable distance, which is utilized, for instance, in automobile vehicles and is formed, at least, by an inner nut and an outer nut, and is configured to receive a screw, wherein
said inner nut is a more or less elongated body provided with two or more non-adjacent sectors from the sagittal medium plane or one transverse sector to the same plane of said inner nut, that provide an outer threading for the threading of said outer nut;

said inner nut is fitted with at least one sector, or two or more non-adjacent sectors from the sagittal medium plane or one transverse sector to the same plane of said inner nut, which are devoid of outer threading and are the support for respective retaining elements towards the inside of said inner nut and provide friction spots against said screw.

2. TOLERANCE COMPENSATOR, according to claim 1, wherein said inner nut can be fitted with more than one leg or retaining element for each non-threaded sector.

3. TOLERANCE COMPENSATOR, according to claim 1, wherein support bases can he defined at one or both ends of the inner nut, which can enhance rigidity of the assembly.

4. TOLERANCE COMPENSATOR, according to claim 1, wherein said retaining elements of the screw are bent legs and are made of plastic material or an inner plastic element.

5. TOLERANCE COMPENSATOR, according to claim 1, wherein said inner nut is an approximately flat sheet that is coiled on itself and can be clockwise or counterclockwise.

6. TOLERANCE COMPENSATOR, according to claim 1, wherein, said threading of said inner nut is metrical.

7. TOLERANCE COMPENSATOR, according to claim 1, wherein said threading of said inner nut is special, not metrical.

8. TOLERANCE COMPENSATOR, according to claim 1, wherein said inner nut is an approximately cylindrical single piece provided with an annular surface at the upper end thereof.

9. TOLERANCE COMPENSATOR, according to claim 1, wherein said outer nut is fitted with an approximately flat base relative to the installation surface thereof.

10. TOLERANCE COMPENSATOR, according to claim 1, wherein said inner nut is an approximately flat sheet that is coiled on itself and can be secured by both faces through connection bridges, riveting, soldering or any other known method.

11. TOLERANCE COMPENSATOR, according to claim 10, wherein said inner nut is approximately hexagonal, viewed in section, and is fitted with three sectors or alternate sides that feature outer threading and further three sectors for supporting said retaining elements towards the inside of said inner nut and for providing said friction spots against said screw.

12. TOLERANCE COMPENSATOR, according to claim 11, wherein the connection of the ends of said sheet forming the inner nut is provided with no fixed connections whatsoever, it being the very outer nut responsible for staying closed and attached to the inner nut.

13. A TOLERANCE COMPENSATOR, configured to fasten two elements together located at a variable distance apart from one another, comprising:
an inner nut; and
an outer nut,
wherein
the tolerance compensator is configured to receive a screw,
said inner nut is an elongate body provided with two or more non-adjacent sectors from the sagittal medium plane or one transverse sector to the same plane of said inner nut, that provide an outer threading for the threading of said outer nut, and
said inner nut is fitted with at least one sector, or two or more non-adjacent sectors from the sagittal medium plane or one transverse sector to the same plane of said inner nut, which are devoid of outer threading and are the support for respective retaining elements towards the inside of said inner nut and provide friction spots against said screw.

14. TOLERANCE COMPENSATOR, according to claim 13, wherein said inner nut can be fitted with more than one leg or retaining element for each non-threaded sector.

15. TOLERANCE COMPENSATOR, according to claim 13, wherein said retaining elements of the screw are bent legs and are made of plastic material or an inner plastic element.

16. TOLERANCE COMPENSATOR, according to claim 13, wherein said inner nut is an approximately flat sheet that is coiled on itself and can be clockwise or counterclockwise.

17. TOLERANCE COMPENSATOR, according to claim 13, wherein said threading of said inner nut is metrical.

18. TOLERANCE COMPENSATOR, according to claim 13, said threading of said inner nut is special.

19. TOLERANCE COMPENSATOR, according to claim 13, wherein said inner nut is an approximately cylindrical single piece provided with an annular surface at the upper end thereof.

20. TOLERANCE COMPENSATOR, according to claim 13, wherein said inner nut is approximately hexagonal, viewed in section, and is fitted with three sectors or alternate sides that feature outer threading and further three sectors for supporting said retaining elements towards the inside of said inner nut and for providing said friction spots against said screw.

* * * * *